Dec. 20, 1960   L. H. SCHMOHL ET AL   2,965,395
HOSE COUPLING AND SOCKET THEREFOR
Filed Oct. 4, 1955

INVENTORS
LELAND H. SCHMOHL AND
BY WILLIAM E. CURRIE

Oberlin + Limbach
ATTORNEYS.

United States Patent Office 2,965,395
Patented Dec. 20, 1960

2,965,395

HOSE COUPLING AND SOCKET THEREFOR

Leland H. Schmohl, Moreland Hills, and William E. Currie, Cleveland, Ohio, assignors to Parker-Hannifin Corporation, a corporation of Ohio Filed Oct. 4, 1955, Ser. No. 538,405

12 Claims. (Cl. 285—40)

The present invention relates to improvements in a hose coupling and socket therefor of the character wherein the end portion of a length of flexible hose is adapted to be gripped between a hose-embracing socket and a nipple inserted into the hose.

In high pressure fluid systems, such as aircraft and machine tool hydraulic systems, for example, flexible hose is in extensive use for joining relatively movable components of such systems, such hose often comprising inner and outer tubular layers of rubber or rubber-like material with an intervening sleeve as of braided steel wire which imparts mechanical strength to the hose so as to be capable of withstanding repeated bending and pulling and of withstanding high fluid pressures without bursting.

In high pressure installations, it is imperative to so firmly grip the hose ends that the couplings will not be blown off. To this end, it has been proposed to strip the outer covering layer of the hose ends down to the braided wire and to provide a coupling at each end which grips the stripped hose end firmly between an internally ribbed or threaded socket and a nipple inserted in the hose end. Obviously, such preliminary stripping of the hose ends involves the expenditure of time and labor and often cannot be done conveniently when replacing a damaged or worn piece of hose. Moreover, the exposed wire braid expands and unravels and thereby weakens the same and renders handling of the hose inconvenient with loose ends of the braid projecting outwardly.

It has also been proposed to grip such hose (without such stripping of the outer layer) as by means of an internally ribbed or threaded socket formed with an undercut adjacent the ribs into which, and the grooves between the ribs, the hose end is expanded and compressed when the nipple is inserted.

However, one disadvantage of the last-mentioned form of hose coupling is that it is difficult to achieve the desired high degree of compression of the hose end between the nipple and the socket, because if this high degree of compression is attempted to be achieved by providing a socket appreciably smaller in diameter than the hose O.D. and having relatively shallow or wide ribs with only small grooves therebetween, it is difficult to thread the socket onto the hose end or to thread the hose end into the socket.

On the other hand, if the high compression of the hose is attempted by use of a nipple substantially larger than the hose I.D., the screwing-in of the nipple tends to force the hose axially out of the socket even though the interengaged nipple-socket threads and socket ribs are of opposite hand, as is the usual practice. In addition, the socket ribs do not engage the braided reinforcing layer and this is not conducive to the provision of a strong grip on the hose end.

With the foregoing in mind, it is a primary object of this invention to provide a re-usable hose coupling which enables firm gripping of a hose of the character indicated without assembly problems and without necessity of stripping the outer layer of the rubber-like material down to the braided reinforcing layer.

Another object of this invention is to provide a hose coupling having a hose-embracing socket which is easy to assemble in place on the hose end while yet a relatively high degree of initial compression is effected.

Still another object is to provide a hose coupling and socket therefor in which the latter is provided with an annular recess into which the hose end is adapted to be expanded by the nipple, and with adjacent high and lower compression zones wherein the hose section is gripped between the nipple and the internal ribs of the socket.

It is another object of this invention to provide a hose coupling and socket in which the latter has formed therein an internally threaded bore composed of a sharp thread and an adjacent series of blunt threads, of which the sharp thread is effective to progressively helically cut or slice the outer covering of the hose upon threading together of the socket and hose, and of which an intervening thread of progressively widening minor diameter truncation is effective to progressively spread apart the thus sliced outer covering for easy entry of the blunt threads thereinto in a position to firmly engage the relatively wide minor diameter truncations thereof with the braided reinforcing layer when the nipple is inserted.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
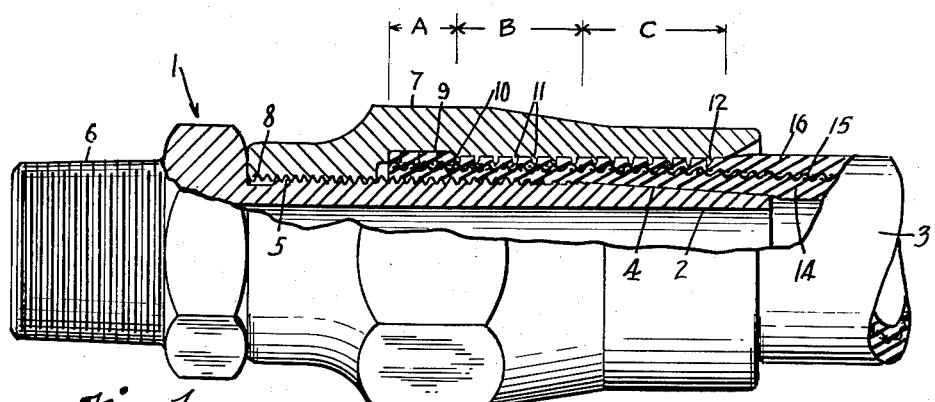
Fig. 1 is a fragmentary longitudinal cross-section view of one form of the present hose coupling, the end portion of a flexible hose being shown firmly clamped between the socket and nipple of the same.

The hose coupling herein shown comprises a nipple 1 of more or less familiar form including a passage 2 therethrough which, in some instances, may be of approximately the same diameter as the I.D. of the hose 3 to be coupled and having a relatively slowly tapering end portion 4, for example, 10° included angle terminating at the large end in a male threaded portion 5. The other end of said nipple may be provided with the usual connector, such as a tapered pipe thread 6, which is adapted to be threaded into a boss of a pump, hydraulic cylinder, or other component of the fluid system. It will be apparent to those skilled in the art that, instead of a connector 6 as shown herein, a swivel nut may be provided which will enable securing of the coupling in place to a male threaded member without turning of the nipple 1.

The hose coupling socket 7 herein also is basically of well known form including a threaded bore 8 at one end into which the nipple 1 is adapted to be screwed, so that the tapered end 4 of the nipple extends into and through the socket.

Adjacent to said threaded bore 8, the socket 7 is formed with an undercut or annular recess 9 providing a chamber into which the hose end is adapted to be expanded and placed under compression, such chamber providing an abutment shoulder 10 to hold the hose 3 from axial withdrawal out of the socket.

The remaining portion of the length of the socket 7 is internally threaded to provide a series of blunt ribs 11 and one or more sharp ribs 12 of substantially uniform minor diameter, the ribs 11 having relatively wide minor diameter truncations as shown, and the ribs 12 having relatively small minor diameter truncations. Otherwise, the series of ribs 11 and 12 may have equal major, minor, and pitch diameters, and equal pitches. Preferably, the widths of the ribs 11 and 12 at their major diameter are slightly less than one-half the widths of the grooves therebetween, and the depths of said ribs 11 and 12 may, as hereinafter explained, be somewhat the same as the thickness of the outer layer of the flexible hose 3 to be coupled. Between the sharp rib 12 and the first full blunt rib 11, there is an intervening rib 13 which has a progressively widening minor diameter truncation.

As shown herein, the flexible hose 3 which is merely given as an example, comprises an inner layer 14 of rubber or rubber-like material, an intermediate layer 15, as of braided steel wire, and an outer layer 16 of rubber or rubber-like material. The outer end of the socket 7 is preferably counter-sunk, as shown, to facilitate entry of the hose 3 thereinto.

As a general rule, the outside diameter of the hose 3 may be approximately the same as the major diameter of the threaded portion 11—12 of the socket 7.

In assembling the coupling, the usual procedure will be to first thread together the socket 7 and the hose 3, the socket threads 11—12 preferably being of hand opposite to threads 5 and 8 for a reason which will appear. As is evident, the sharp rib or ribs 12 adjacent the outer end of the socket will relatively easily be embedded in the outer layer 16 of the hose 3 and will, in fact, cut or slice substantially through the outer layer 16 of the hose.

Thus, the intervening thread portion 13 will progressively spread apart the helical cut for positioning the blunt threads for direct engagement with the reinforcing layer 15. The threading together of the socket 7 and hose 3 is continued until the hose end abuts the end of recess 9 as in Fig. 3.

Finally, the nipple 1 and socket 7 will be screwed together, whereupon the tapered end 4 of the nipple will cause the hose section to be jammed into the grooves between the ribs 11 and 12 and to be explanded and compresssed in the annular recess 9 as is shown in Fig. 1.

By reason of the provision of the undercut or recess 9, and the series of blunt threads 11 in combination with the tapered nipple 1, there are provided three hose gripping zones, namely (identified A, B, C in Figs. 1 and 2), (A) that between the recess 9 and the largest diameter of the nipple 1 wherein the hose 3 is expanded to abut shoulder 10; (B) that between the blunt threads 11 and the large portion of the nipple 1 wherein the hose is subjected to the highest degree of compression; and (C) that between the remaining blunt threads 11 and sharp thread 12 and the tapered portion 4 of the nipple wherein the hose is yet firmly gripped, the magnitude of the grip on the hose in this zone (C) being progressively less by reason of the tapering of the nipple 1. Such progressive reduction of gripping pressure is desired to avoid a high stress concentration plane at the junction of the socket end with the hose 3.

As aforesaid, the threads 5—8 and 11—12 are preferably of opposite hand (right-hand threads 5—8 and left-hand threads 11—12) so that, when the nipple 1 and socket 7 are screwed together, any tendency of the hose 3 and socket 7 to relatively rotate will be in a direction screwing the hose 3 further into the socket 7.

While not required, it may be desired in some instances to lubricate the threads 5 or 8 and/or to lubricate the tapered surface 4 of the nipple 1 to facilitate assembly of the hose coupling. Also the threads 11 and 12 may or may not be lubricated, as desired.

Figure 2:
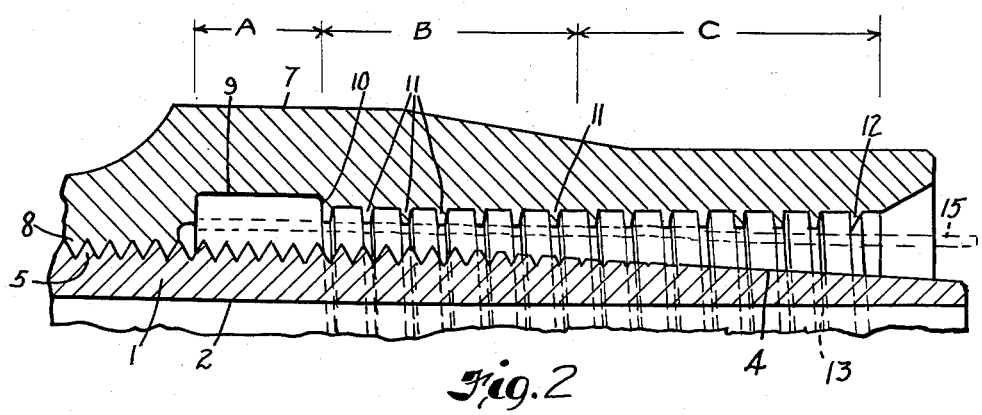
Fig. 2 is a fragmentary radial cross-section view, on much enlarged scale, of the socket and nipple of the Fig. 1 hose coupling, the hose having been omitted.

Referring further to the gripping of the hose 3 in the zones A, B, and C, it is to be noted that in zone A the hose wall is bodily gripped by expanding the hose to contact the wall of recess 9; that in zone B the minor diameter truncations of the blunt threads 11 exert high pressure clamping action directly on the braided reinforcing layer 15 of the expanded hose as shown in Fig. 1 and in dot-dash lines in Fig. 2; and that in zone C the compression on the hose is gradually lessened so that the remaining blunt threads 11 no longer are in contact with the reinforcing layer 15 (see Figs. 1 and 2).

Figure 3:
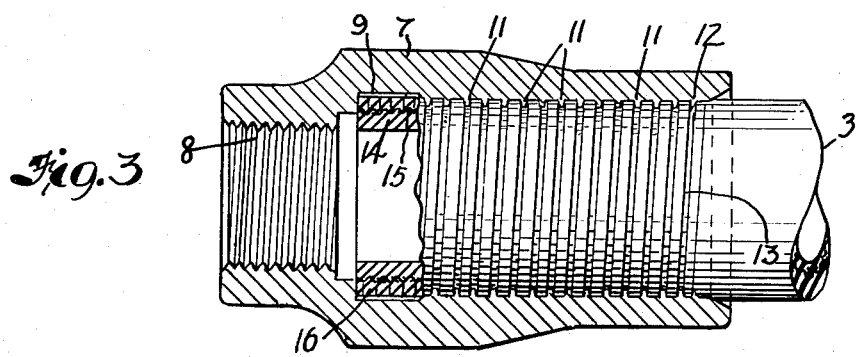
Fig. 3 is a cross-section view showing the socket and hose threaded together ready for completion of the assembly by insertion of the nipple into the hose.

In the form of the invention illustrated in Figs. 1–3, the depth of threads 11, 12, and 13 is approximately the same as the thickness of the outer layer 16 of the hose, but such thread depth may be greater or less when it is desired to compress the outer layer 16 to less or greater extent in the chambers between the threads 11. It has been found that compression of the outer layer 16 by the amount occupied by the ribs 11, in addition to the compression effected by reducing the wall thickness of the hose in zone B, suffices, and has the effect of distributing more uniformly the hose clamping pressure longitudinally along the nipple 1.

Furthermore, by making the thread depth about the same as the thickness of the outer layer 16 of the hose 3 and by forming the threads 11, 12, and 13 so that the minor diameter is substantially uniform, the hose 3 and socket 7 may be readily threaded together, the sharp thread or threads 12 being effective to score or slice substantially through the layer 16, the thread 13 being effective to progressively spread the slit apart, and the blunt threads being guided into the slit for direct, strong gripping engagement with the braided layer 15.

As evident, we have conceived a hose coupling in which an advantage of stripped hose couplings is achieved, that is, a strong grip directly on the wire braid, but, without necessity of stripping off the outer layer of the hose. An added advantage is that the hose coupling herein is reusable, since the blunt threads 11 are not deformed by contact with the wire braid 15, and the sharp thread 12 is not damaged or deformed by any high pressure contact with the braid 15.

A still further advantage of our hose coupling is that, because the outer layer 16 of the hose is not removed, it serves, when compressed, to more uniformly distribute the clamping pressure along the nipple 1, especially in the high pressure zone B and to contribute to the progressively relaxing of the hose grip in zone C to avoid a high stress concentration plane. Furthermore, the blunt threads 11 do not tend to cut or sharply bend the wires of the layer 15 even under high pressure as would the sharp thread 12 if used to grip the hose 3 on its braid 15.

Figure 4:
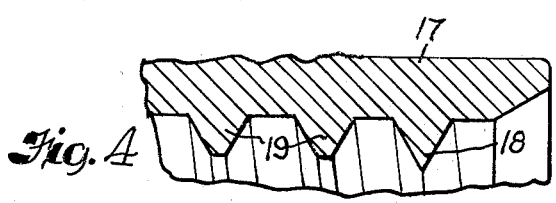
Fig. 4 is a fragmentary radial cross-section view, similar to Fig. 2, except illustrating another form of socket.

In the form of the invention illustrated in Fig. 4, the socket 17 is similar to socket 7 except that the sharp, cutting thread 18 has a minor diameter less than the minor diameter of the adjacent blunt threads 19. The principle of operation of socket 17 is substantially the same as that of socket 7; and, therefore, repetition is not deemed necessary.

In essence, we have provided a hose coupling in which the socket 7 or 17 thereof has an integral cutting tool 12 or 18 which automatically helically slits the outer layer 16 of the hose, when the latter is screwed into the socket, for positioning of blunt threads 11 or 19 for gripping the hose directly on the wire reinforcing braid 15 thereof.

In order to realize the advantages of this invention, the minor diameter of the blunt threads 11 or 19 should be at least as great as the minor diameter of the sharp thread or threads 12 or 18. If the blunt threads 11 or 19 have a minor diameter appreciably less than the minor diameter of the sharp thread or threads 12 or 18, then it becomes increasingly difficult to assemble the socket 7 or 17 and the hose 3. In addition, the blunt threads 11 or 19, not being effective to cut through layer 16, would not then engage the braid 15 to provide the strong grip achieved with the couplings herein disclosed.

It has been found desirable to include a sharp rib 12 or 18 which is at least one full revolution for effecting the desired slitting action on the outer layer 16 of the hose 3. Of course, the sharp thread 12 or 18 may extend more than or less than one revolution around the socket, if desired.

We have found that, for the purpose of slitting the outer layer 16 of the hose 3, the sharp threads 12 or 18 need not be sharp knife edges but, instead, may have a minor diameter truncation up to about .010", and the included angle of such threads may be about 30° or less and of saw-tooth form as in Figs. 1–3 or of V-form (up to about 60° included angle, if desired) as in Fig. 4, or of other modified V-form with concavely curved sides, for example. Such thread has adequate strength and properly performs its slitting operation, whereas a sharp thread with say a knife edge and a small included angle of 5–10° would not have the necessary strength and durability unless the socket 7 or 17 were made of high quality, expensive, hardened, and tempered steel.

For a ¾" O.D. hose 3, we have found that threads 11 and 12 and 18 and 19 have operated in the desired manner when the major diameters thereof are nearly equal to the hose O.D. and when the minor diameter truncations are at least several times wider than the sharp thread truncations. The threads 11 and 12 are preferably of equal minor diameter with a .010 truncation on the threads 12, and the sharp thread 18 preferably has a minor diameter about .035" less than threads 19.

Excellent results have been obtained using a hose 3 having a braid 15 of diameter 1/64" to 3/64" greater than the minor diameter of the socket threads 11 and 12, for example; thus, the sharp thread 12 slices all the way through the outer layer 16 of the hose and ensures that the blunt threads 11 will be brought into direct engagement with the braid 15 in the gripping zones B and C. In this case, the diameter of the tapered portion 4 of nipple 1 which is opposite the sharp thread 12 should be such that sharp bending or cutting of the braid 12 is avoided.

Other modes of applying the principle of the invention may be employed, change being made as regards the details described, provided the features stated in any of the following claims, or the equivalent of such, be employed.

We therefore particularly point out and distinctly claim as our invention:

1. A hose coupling for gripping flexible hose of the type having inner and outer layers and an intervening reinforcing layer, said coupling comprising interfitting socket and nipple members which define therebetween an annular hose end gripping space, said socket member being formed with internal screw threads formed on substantially a single helix, the thread toward the open end of said socket being relatively sharp in cross-section and the following thread inwardly of said socket being relatively blunt, the former thread having an included angle less than about 60° and disposed to cut a helical slit in the outer layer of such hose for entry of the latter thread to engage the reinforcing layer as such hose and socket member are threaded together, said socket and nipple member comprising means for clamping said hose in said space subsequent to entry of said threads in said slit.

2. A hose coupling for gripping flexible hose of the type having inner and outer layers and an intervening reinforcing layer, said coupling comprising interfitting socket and nipple members which define therebetween an annular hose end gripping space, said socket member being formed with internal screw threads formed on the same helix, the thread toward the open end of said socket being relatively sharp in cross-section and the following thread inwardly of said socket being relatively blunt, the former thread having an included angle less than about 60° and disposed to cut a helical slit in the outer layer of such hose for entry of the latter thread to engage the reinforcing layer as such hose and socket are threaded together, said socket and nipple comprising means for clamping said hose in said space subsequent to entry of said threads in said slit.

3. In combination, a length of flexible hose having inner and outer layers and an intervening reinforcing layer; and interfitted socket and tapered nipple members defining therebetween an annular space in which an end portion of said hose is gripped, said socket member commencing adjacent its open end being formed with internal screw threads including adjacent relatively sharp and relatively blunt internal threads on the same helix and of approximately the same minor diameter of which the latter is disposed in a helical slit formed by the former in the outer layer of said hose during threading together of said hose and socket member, said blunt thread being directly engaged with said reinforcing layer to clamp said hose against said nipple member, and said sharp thread being opposite to a portion of said nipple that is of smaller diameter than the portion thereof opposite said blunt thread.

4. The combination of claim 3 wherein the socket member is formed with a plurality of blunt threads into the spaces therebetween said outer layer is compressed to supplement the hose clamping pressure exerted by said blunt threads, the spaces between said blunt threads at their major diameter being greater than the widths of said blunt threads.

5. The combination of claim 3 wherein said socket has an intervening thread also on the same helix that progressively becomes blunter from said sharp thread to said blunt thread to facilitate entry of said blunt thread into such helical slit formed in the outer layer of said hose by said sharp thread.

6. In a hose coupling of the type wherein the end portion of a flexible hose is adapted to be frictionally gripped between an internally threaded socket and a tapered nipple, the improvement which comprises providing a socket which has adjacent relatively blunt and relatively sharp internal screw threads on the same helix, said sharp thread commencing adjacent the open end of said socket and having an included angle less than about 60° and disposed to form a helical slit in the outer surface of such hose for embedding of said blunt thread therein as said socket and such hose are screwed together, the minor diameter of said blunt thread being at least as great as the minor diameter of said sharp thread, and the smaller end portion of said nipple being disposed opposite said sharp thread so as to subject the hose to greater squeeze between said blunt thread and said nipple than between said sharp thread and said nipple.

7. The hose coupling of claim 6 wherein the included angle of said sharp thread is not substantially greater than about 30°.

8. The hose coupling of claim 6 wherein said socket is formed with an intervening thread also on the same helix that becomes progressively blunter from said sharp thread to said blunt thread so as to progressively spread apart such helical slit for facilitating entry of said blunt thread into such helical slit.

9. The hose coupling of claim 6 wherein said sharp thread extends for at least one turn.

10. A hose coupling for gripping flexible hose of the type having inner and outer layers and an intervening reinforcing layer, said coupling comprising interfitting socket and nipple members which define therebetween an annular hose end gripping space, one of said members being formed with screw threads formed on the same helix, the thread toward the open end of such hose end gripping space being relatively sharp in cross-section and the following thread inwardly of said one of said members being relatively blunt, the former thread having an included angle less than about 60° and disposed to cut a helical slit in the layer of such hose engaged thereby for entry of the latter thread to engage the reinforcing layer as such hose and said one of said members are threaded together, said socket and nipple members comprising means for clamping said hose in such space subsequent to entry of said threads in said slit.

11. In combination, a length of flexible hose having inner and outer layers and an intervening reinforcing layer; and interfitted socket and nipple members defining therebetween an annular space in which an end portion of said hose is gripped, one of said members commencing adjacent the open end of such annular space being formed with screw threads including adjacent relatively sharp and relatively blunt threads on the same helix and of approximately the same diameter of which the latter is disposed in a helical slit formed by the former in the layer of said hose engaged thereby during threading together of said hose and said one of said members, said blunt thread being directly engaged with said reinforcing layer to clamp said hose against the other of said members, and said sharp thread being opposite to a portion of said other of said members that is of diameter such that the radial dimension of the annular space thereat and adjacent the open end of said space is greater than the radial dimension of the portion of said other of said members opposite said blunt thread.

12. In a hose coupling of the type wherein the end portion of a flexible hose is adapted to be frictionally gripped between a socket member and a nipple member, one of which is formed with threads and both of which define an annular hose end gripping space which is of generally tapered form from one end toward its open hose receiving end, the improvement which comprises providing one of said members with adjacent relatively blunt and relatively sharp screw threads on the same helix, said sharp thread commencing adjacent the open end of said space and having an included angle less than about 60° and disposed to form a helical slit in the surface of the hose engaged thereby for embedding of said blunt thread therein as said one of said members and such hose are screwed together, the diameter of said blunt thread at least adjacent said sharp thread being of generally the same diameter as said sharp thread, and the portions of the other of said members opposite said sharp and blunt threads being disposed so as to subject the hose to greater squeeze between said blunt thread and the portion of said other of said members opposite to said blunt thread than between said sharp thread and the portion of said other of said members opposite to said sharp thread.

References Cited in the file of this patent

UNITED STATES PATENTS

| | | |
|---|---|---|
| 273,731 | Harvey | Mar. 13, 1883 |
| 1,969,548 | Eastman | Aug. 7, 1934 |
| 2,009,679 | Placide | July 30, 1935 |
| 2,147,356 | Scholtes | Feb. 14, 1939 |
| 2,304,244 | Criner | Dec. 8, 1942 |
| 2,371,971 | Main et al. | Mar. 20, 1945 |
| 2,416,964 | Stull | Mar. 4, 1947 |
| 2,479,683 | Hufferd | Aug. 23, 1949 |
| 2,797,111 | Beazley | June 25, 1957 |

FOREIGN PATENTS

| | | |
|---|---|---|
| 660,432 | Great Britain | Nov. 17, 1951 |
| 1,075,787 | France | Apr. 14, 1954 |